Figure 1:
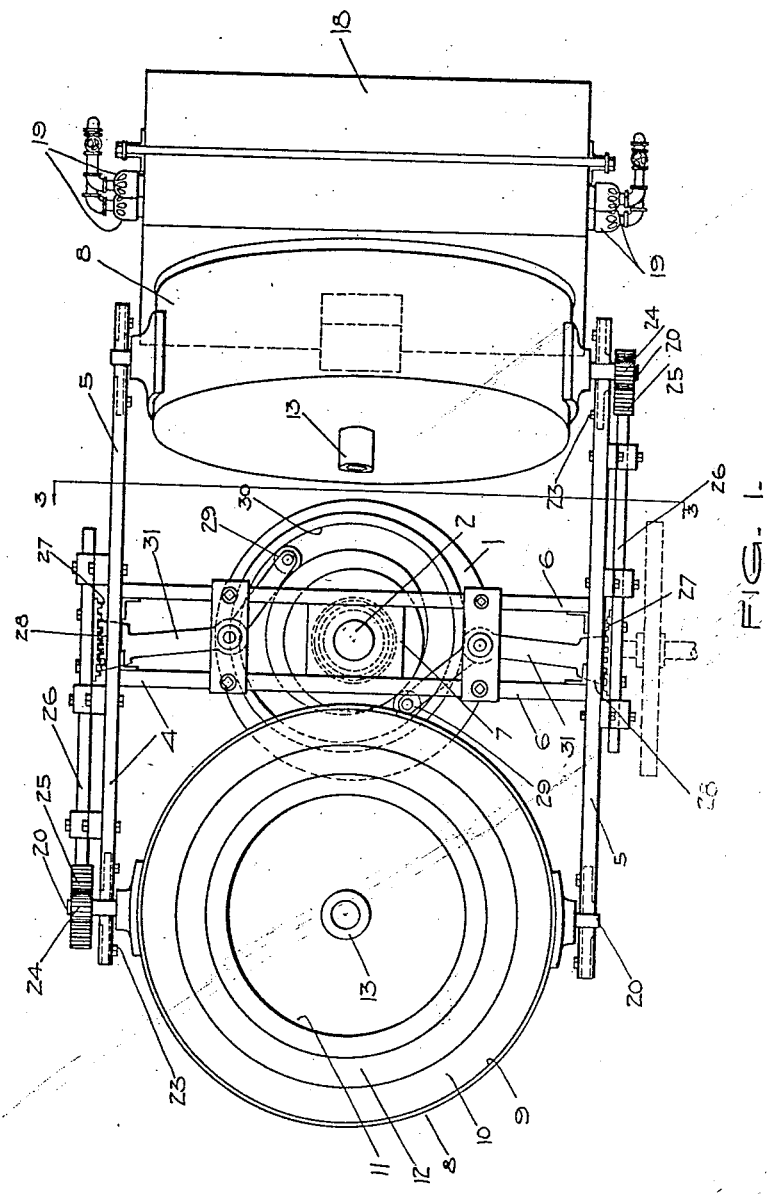

R. L. & F. J. FRINK.
DRAWING POT FOR GLASS.
APPLICATION FILED FEB. 27, 1914.

1,302,149.

Patented Apr. 29, 1919.
3 SHEETS—SHEET 3.

WITNESSES:—

INVENTORS
Robert L. Frink
and Fred J. Frink
BY
J. B. Fay
ATTORNEY

UNITED STATES PATENT OFFICE.

ROBERT L. FRINK AND FRED J. FRINK, OF LANCASTER, OHIO; SAID FRED J. FRINK ASSIGNOR TO SAID ROBERT L. FRINK.

DRAWING-POT FOR GLASS.

1,302,149.  Specification of Letters Patent.  Patented Apr. 29, 1919.

Application filed February 27, 1914. Serial No. 821,396.

*To all whom it may concern:*

Be it known that we, ROBERT L. FRINK and FRED J. FRINK, citizens of the United States, and residents of Lancaster, county of Fairfield, and State of Ohio, have jointly invented a new and useful Improvement in Drawing-Pots for Glass, of which the following is a specification, the principle of the invention being herein explained and the best mode in which we have contemplated applying that principle, so as to distinguish it from other inventions.

The present invention relates to mechanism for use in connection with the manufacture of window glass, and more particularly for use in connection with the drawing of glass sheets, or cylinders, forming a feature of such manufacture as at present practised. In such drawing operation a quantity of the molten glass or metal as it is called, is placed in a suitable receptacle, and a bait then lowered into the metal and raised, as a result of which the glass adhering to such bait is drawn upwardly in the form of a sheet or cylinder, depending upon the shape of the bait. The requisite metal for such drawing operation is supplied to the pot either through a direct connection with a tank, wherein the metal is stored in quantity, or else by dipping the metal over from said tank to the pot. In the latter case more especially, there is apt to be, in the course of time, owing to the cooling influence of the atmosphere an accumulation of congealed metal or glass within the pot, which it becomes necessary to remove before proceeding, by external application of heat thereto so as to enable such accumulation to be drawn off.

The present invention has among its objects the provision of an improved arrangement for thus melting and distributing or draining off the solidified glass that thus accumulates, as also, more generally a drawing pot that will be convenient and accessible in operation and really adapted for use in drawing glass cylinders wherein air, or other pressure fluid, is introduced at the base of the rising cylinder, or, in other words, through the bottom of the drawing pot. To the accomplishment of the foregoing and related objects said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 2:
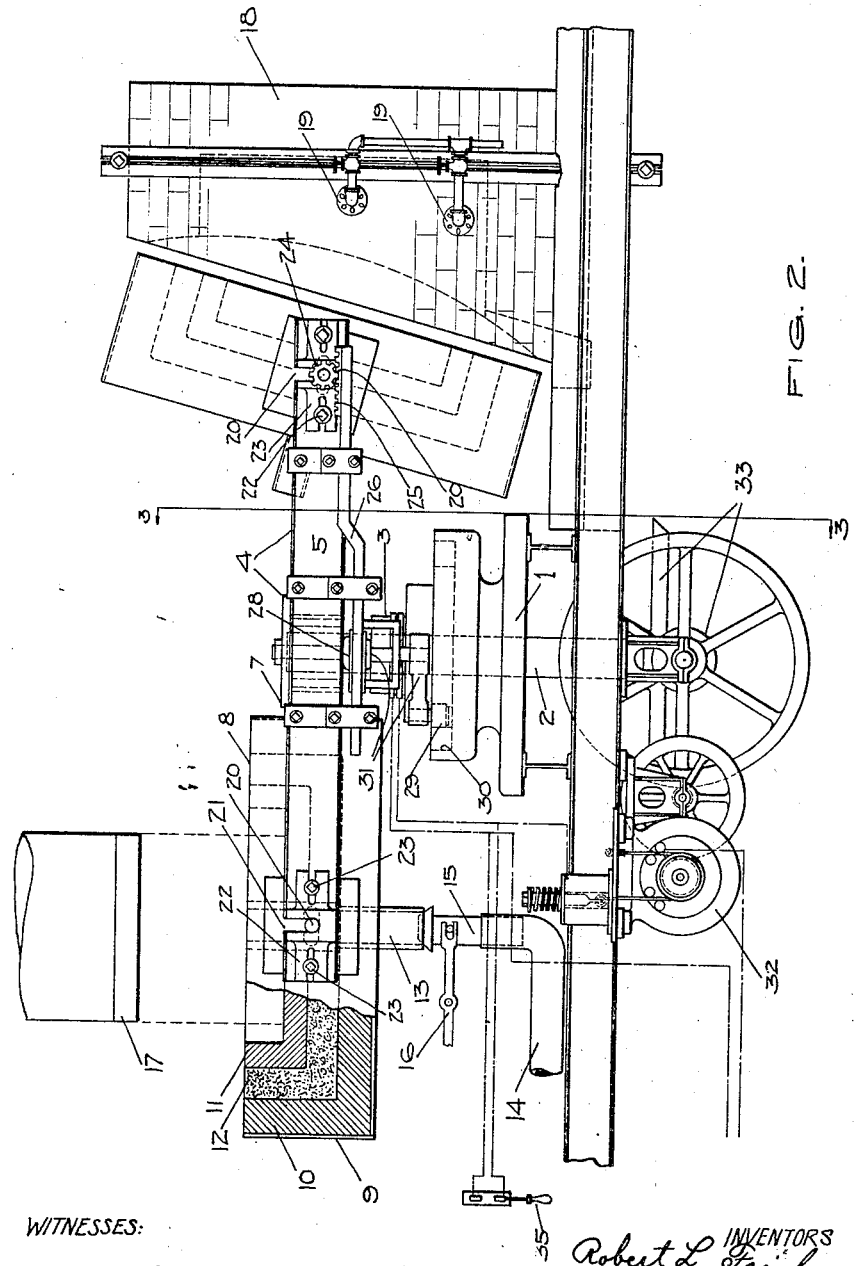
Figure 3:
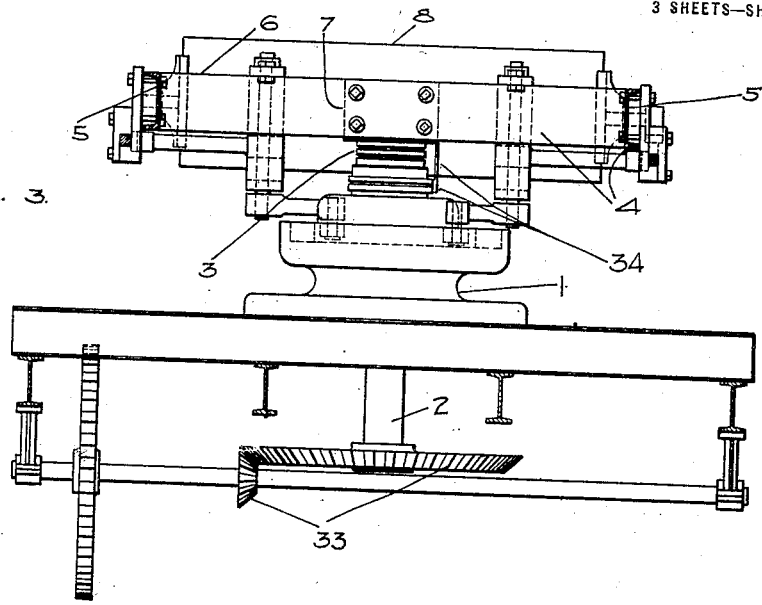
Figure 4:
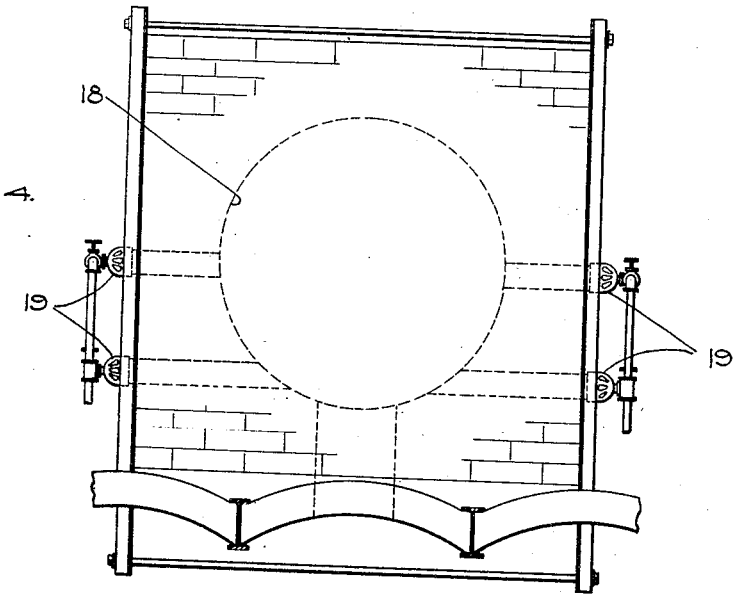

Figure 1 is a plan view of a mechanism, or apparatus, involving our present improvements; Fig. 2 is a side elevation of the same; Fig. 3 is a sectional view thereof taken on the line 3—3, Figs. 1 and 2; and Fig. 4 is an end elevational view thereof, as seen from the right in Figs. 1 and 2.

The base of the machine consists of a pedestal or like solid stand 1, vertically through which there extends a shaft 2 surrounded by a ball-bearing 3 adapted to rotatably support a frame 4. The general construction of said frame appears in Fig. 1; it preferably comprises simply two parallel beams or channels 5 lying in a substantially horizontal plane and secured together by transverse members or beams 6, that are attached in turn to a block 7 fitted onto said shaft and resting on the ball-bearings provided in conjunction with the latter.

The glass-working receptacles 8, or drawing pots proper, are two in number, and are borne, one at each end of the frame just described. In the construction of such receptacles we avail ourselves of the principle fully described in connection with the stationary pot shown in a patent of one of the present inventors, No. 941,512, dated November 30, 1909, for an improved method of and means for manufacturing window glass; such principle being the conservation of the heat of the metal, instead of the application of heat from without, in order to maintain such metal at the proper temperature during the drawing operation. In the present case the receptacle, or drawing pot, mounted as aforesaid, is built up of an exterior metal shell 9 lined with suitable heat resistant material 10, such as fire clay or the like, within which, and spaced therefrom, is supported a vessel 11 likewise of clay or other suitable refractory material wherein the molten glass is designed to be placed. The space intervening between the lining and such inner vessel is packed with heat insulating material 12, as, for example, mineral wool, asbestos or the like, which serves to thoroughly insulate the vessel from the chilling influence of the atmosphere and makes even "rollers" possible.

The pots are mounted in the rotatable frame 4 by means of trunnions 20 attached to opposite sides of the outer shell 9, so that each may be independently tilted about a substantially horizontal axis. Side members 5 of the frame are cut away, as at 21, to allow said trunnions to rest in bearing blocks 22 adjustably secured to the members in question. Accordingly by loosening the bolts 23, that are provided to hold said blocks in position, such position may be varied to shift the corresponding pot in or out from the central axis of the machine.

Centrally extending through the bottom of the receptacle, including such outer shell 9, lining 10, and inner vessel 11, is a tubular member, or stem 13 through which air, or other fluid, is designed to be supplied or exhausted, depending upon the character of the drawing operation. This stem extends upwardly to substantially the level of the upper edge of the receptacle, while its lower end extends below the bottom a sufficient distance to adapt it for ready engagement with a relatively stationary exterior supply pipe 14, in one position of the frame about its vertical axis (see Fig. 2). Connection between such supply pipe and the stem in the pot may be made or broken by an extensible section 15 forming the termi s of the supply pipe, as shown in Fig. 2, a lever 16 serving to raise or lower such extension as occasion may demand. The position occupied by a drawing pot, when thus connected with the external supply pipe, is the one in which the drawing operation is intended to be carried on, and hence may be called the drawing station, a suitable bait 17 being vertically reciprocable over such station so as to be adapted to be lowered into and raised from a pot thus positioned.

Diametrically opposite from such drawing station is the draining station in which the other pot, of the two thus seen to be carried by the frame 4, may be heated so as to melt down any solidified glass therein. To this end heating means are provided in the form of a chamber 18 disposed laterally adjacent to the path of travel of the drawing pots on their support. Such chamber is preferably constructed of brick and is open on the side directed toward the previously described parts of the machine, so that a pot, when tilted in the frame is adapted to register fairly closely with the chamber walls, which will be seen to incline upwardly and rearwardly (Fig. 2). Two series of burners 19 extend through such walls, and into the chamber, so that when a pot is thus coöperative with the latter an ignited blast of gas may be directed into the inner vessel 11 of the pot and thus melt down the glass, which will drain over the lower edge of the latter into a trough disposed for this purpose along the lower edge of the chamber.

The pots 8 are designed to be automatically tilted to assume a position in which they are thus adapted to register with the heating means, as they alternately approach the draining station. With this in view, one of the supporting trunnions 20 of each pot is formed to project beyond its bearing sufficiently to receive a pinion 24 with which in turn meshes a rack 25 carried by the outer end of a bar 26 reciprocably attached to the corresponding side member of the frame. Another rack 27 is provided on the inner face of each such bar at a point directly opposite to the stand 1, that supports the frame, wherewith meshes a segmental gear 28 pivotally mounted between the transverse members 6 of the frame. The arm 31 carrying such segmental gear extends inwardly so as to form in effect a bell-crank and carries a roller 29 that travels in continuous engagement with a cam groove 30 formed in the upper face of the stand. While of general circular form, this groove is in part eccentric, so that, as a result it will be seen that such bell cranks and thus the segmental gears carried by their outer arms will be alternately given an oscillatory movement, as the frame rotates about such stand; this movement is translated into a reciprocatory movement of the respective bars which control the positions of the two pots about their horizontal axes.

The form of the groove in the stand is properly designed to maintain each pot in the substantially horizontal position appearing at the right of Figs. 1 and 2, when brought in or near the drawing station; while such pot is similarly tilted into the outwardly inclined position shown at the right of the figures just named, when brought in or near the draining station. The positioning of the pots it will thus be seen is automatically accomplished and requires no attention on the part of the operator. The latter hence need merely control the rotative movement of the frame, and even this we propose to accomplish in part automatically.

To rotate the frame in the fashion previously described any suitable driving mechanism may of course be provided, but preferably an electric motor 32, which may be mounted beneath the lower or general supporting frame work upon which the stand 1 rests, will be used. Such motor is then connected with the upright shaft 2 that extends through said stand by means of the bevel gears 33 clearly shown in Fig. 2. The supply of current to this motor we propose shall be controlled in the first instance by a circuit breaking and making device associated with the frame and preferably consisting of a commutator 34, or the like, (Fig. 3), mounted directly below the bearing 3 that supports such frame. The construction of this device is such that the current will be automatically cut off from the motor when the pots are respectively positioned in operative relation to the drawing mechanism and heating means, shown in Figs. 1 and 2. In order, however, to start the frame to rotate, independent means for closing the circuit such as a manually operable switch 35, need to be provided. It is merely necessary to close such switch momentarily, until, in other words, the break in the device operated by the frame has been passed, when such switch may be again opened and the further movement of the frame and the two pots carried thereby will be taken care of by the automatic control device.

The general operation of our improved drawing pots has been, it is believed, indicated with sufficient clearness incidently to the description of their construction and that of the mechanism carrying the same and coöperating therewith. It will be understood that the molten glass in the present instance will be placed in the pot at or before it reaches the drawing station occupied by the drawing pot at the left in Figs. 1 and 2. Upon the completion of the drawing operation, substantially withdrawing as such operation will the glass thus supplied to said pot, the switch 35 will be closed long enough to start the frame to rotate; then such switch will be opened, current for the further rotation of the frame being supplied by the branch of the circuit closed through the commutator 34. As the rotation progresses the pot just emptied of glass will be tilted outwardly to assume the position which the pot at the right in Figs. 1 and 2 is shown as occupying; while such previously tilted pot is righted as it is brought around into position below the bait 17 at the drawing station. Upon the completion of this reversal of position of the pots, that is, upon a full half rotation of the frame, the current is automatically cut off and rotation stopped. It will, of course, be understood that the air connection will be broken just before rotation is started to thus interchange the position of the pots, by depressing pipe section 15; while similarly such connection will be closed again when the other pot has been brought around to the drawing station.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. The combination of a support rotatable about a substantially vertical axis; a glass-working receptacle borne by said support; heating means radially adjacent to the path of travel of said support, said means being adapted to heat the glass in said receptacle, said receptacle being tiltable about a substantially horizontal axis transversely disposed of a radial line to the axis of said support into operative relation with said means; and means adapted automatically thus to tilt said receptacle incidentally to the rotation of said support.

2. The combination of a support rotatable about a substantially vertical axis; a glass-working receptacle borne by said support and tiltable about a substantially horizontal axis transversely disposed of a radial line to the axis of said support; glass-drawing mechanism adapted to coöperate with said receptacle when horizontally disposed; heating means adapted to coöperate with said receptacle when tilted into a substantially vertical position; and means adapted to alternately position said receptacle to coöperate with said drawing mechanism and with said heating means incidentally to the rotation of said support.

3. The combination of a stand; a frame rotatable thereon about a substantially vertical axis; a glass-working receptacle borne by said frame and tiltable about a substantially horizontal axis transversely disposed of a radial line to the axis of said support; glass-drawing mechanism, including a vertically reciprocable bait and separable air-supply connections for said receptacle, adapted to coöperate with the latter when horizontally disposed; heating means adapted to coöperate with said receptacle when tilted into a substantially vertical position; and connections between said stand and receptacle adapted to alternately position said receptacle to coöperate with said drawing mechanism and with said heating means incidentally to the rotation of said support.

4. The combination of a support movable in a substantially horizontal plane; two glass-working receptacles borne by said support and independently tiltable about axes in such plane transversely disposed of a radial line to the axis of said support; glass drawing mechanism adapted to coöperate with either receptacle in horizontal position; and heating means adapted simultaneously to coöperate with the other receptacle in a substantially vertical position.

5. The combination of a support rotatable about a substantially vertical axis; two glass-working receptacles borne by said support and independently tiltable about substantially horizontal axes transversely disposed of a radial line to the axis of said support; glass-drawing mechanism adapted to coöperate with either receptacle in horizontal position; heating means adapted simultaneously to coöperate with the other receptacle in a substantially vertical position; and means adapted to alternately position said receptacles to coöperate with said drawing means and with said heating means incidentally to the rotation of said support.

6. The combination of a stand; a frame rotatable thereon about a substantially vertical axis; two glass-working receptacles borne by said frame and independently tiltable about substantially horizontal axes transversely disposed of a radial line to the axis of said support; glass-drawing mechanism, including a vertically reciprocable bait and separable air supply connections, adapted to coöperate with said either receptacle in horizontal position; heating means adapted simultaneously to coöperate with the other receptacle in a substantially vertical position; and connections between said stand and receptacles adapted to alternately position the latter to coöperate with said drawing means and with said heating means incidentally to the rotation of said support.

7. In mechanism of the class described, the combination with a heating chamber having one side open and the front of its rear wall inclining upwardly and rearwardly, substantially as described, and a tiltable pot adapted in one position to lie with its top opposite such chamber-side and similarly inclined.

8. In mechanism of the class described, the combination with heating means including a heating chamber having one side open and the front of its rear wall inclining upwardly and rearwardly; of a movably supported, tiltable pot adapted in one position to lie with its top opposite such chamber-side and similarly inclined.

9. In mechanism of the class described, the combination with heating means including a chamber having one side open and the front of its rear wall inclining upwardly and rearwardly, and gas burners arranged to discharge into such chamber; of a movably supported, tiltable pot adapted in one position to lie with its top opposite such chamber-side and similarly inclined.

10. In mechanism of the class described, the combination with heating means including a heating chamber having one side open and the front of its rear wall inclining upwardly and rearwardly; of a support rotatable in a substantially horizontal plane; and a pot mounted on said support so as to be tiltable about a horizontal axis, said pot being adapted in one position of said support to lie with its top opposite such chamber-side and similarly inclined.

11. In mechanism of the class described, the combination with heating means including a heating chamber having one side open and the front of its rear wall inclining upwardly and rearwardly; of a support rotatable in a substantially horizontal plane; and a plurality of pots mounted on said support so as to be independently tiltable about horizontal axes, each of said pots being adapted in successive positions of said support to lie with its top opposite such chamber-side and similarly inclined.

12. In mechanism of the class described, the combination with heating means including a heating chamber having one side open and the front of its rear wall inclining upwardly and rearwardly; of a support rotatable in a substantially horizontal plane; and a plurality of pots mounted on said support so as to be independently tiltable about horizontal axes disposed transversely of radial lines to the axis of said support, each of said pots being adapted in successive positions of said support to lie with its top opposite such chamber-side and similarly inclined.

13. In mechanism of the class described, the combination with heating means including a heating chamber having one side open; of a support adjacent thereto rotatable in a substantially horizontal plane; and a pot mounted on said support so as to be tiltable about a horizontal axis disposed transversely of a radial line to the axis of said support, said pot being adapted in one position of said support to lie with its top opposite to and substantially parallel with such chamber-side.

14. In mechanism of the class described, the combination with heating means including a heating chamber having one side open; of a support adjacent thereto rotatable in a substantially horizontal plane; and a plurality of pots mounted on said support so as to be independently tiltable about horizontal axes disposed transversely of radial lines to the axis of said support, each of said pots being adapted in successive positions of said support to lie with its top opposite to and substantially parallel with such chamber-side.

Signed by us this 23d day of Feby., 1914.
ROBERT L. FRINK.
FRED J. FRINK.
Attested by—
H. K. BECK,
P. R. PETERS.